United States Patent
Bacon et al.

(10) Patent No.: US 11,643,968 B2
(45) Date of Patent: May 9, 2023

(54) AIRCRAFT AIR INTAKE SYSTEMS EMPLOYING GILLS

(71) Applicant: Textron Innovations Inc., Providence, RI (US)

(72) Inventors: Bruce Bennett Bacon, Euless, TX (US); Kristine Joyce Lazo, Dallas, TX (US); Shawn Patrick Leonard, Jr., Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 86 days.

(21) Appl. No.: 17/313,267

(22) Filed: May 6, 2021

(65) Prior Publication Data

US 2022/0356841 A1  Nov. 10, 2022
US 2022/0356841 A1  Nov. 10, 2022

(51) Int. Cl.
*F02C 7/055* (2006.01)
*F02C 7/057* (2006.01)
*B64D 33/02* (2006.01)

(52) U.S. Cl.
CPC ............ *F02C 7/057* (2013.01); *B64D 33/02* (2013.01); *F02C 7/055* (2013.01); *B64D 2033/0253* (2013.01); *F05D 2220/329* (2013.01); *F05D 2240/12* (2013.01)

(58) Field of Classification Search
CPC .. F02C 7/055; F02C 7/042; F02C 7/05; F02C 7/052; B64D 2033/022
See application file for complete search history.

(56) References Cited

U.S. PATENT DOCUMENTS

| | | | | | |
|---|---|---|---|---|---|
| 2,356,325 | A | * | 8/1944 | Larsen | F24F 13/12 454/334 |
| 3,094,189 | A | * | 6/1963 | Dean, Jr. | F24F 13/12 454/262 |
| 3,449,891 | A | * | 6/1969 | Amelio | B01D 45/16 55/306 |
| 3,720,154 | A | * | 3/1973 | Biggi | F24F 13/075 454/325 |

(Continued)

FOREIGN PATENT DOCUMENTS

| FR | 3048233 A1 * | 9/2017 | ............ B64D 33/02 |
|---|---|---|---|
| GB | 1201096 A * | 8/1970 | |

OTHER PUBLICATIONS

Hwa, Victor, Test and Evaluation of an Inlet Barrier Filter to Increase Engine Time-On-Wing for the Bell Boeing V-22 Osprey Tiltrotor, May 2015, The University of Texas at Arlington, pp. 4-6. (Year: 2015).*

*Primary Examiner* — Todd E Manahan
*Assistant Examiner* — Marc J Amar
(74) *Attorney, Agent, or Firm* — Lawrence Youst PLLC

(57) ABSTRACT

An air intake system for an aircraft, which is switchable between a performance mode and a filtered mode, includes a duct forming filtered air inlet slits. The air intake system also includes interconnected gills adjacent to the filtered air inlet slits. The gills are movable between various gill positions including a closed position substantially covering the filtered air inlet slits and an open position substantially exposing the filtered air inlet slits. The air intake system also includes an actuator configured to move the gills into the closed position in the performance mode and the open position in the filtered mode.

20 Claims, 9 Drawing Sheets

(56) References Cited

U.S. PATENT DOCUMENTS

| | | | | |
|---|---|---|---|---|
| 4,899,958 | A | * | 2/1990 | Horikawa .............. B64D 33/02 |
| | | | | 137/15.1 |
| 8,721,756 | B2 | | 5/2014 | Handley et al. |
| 10,023,296 | B2 | | 7/2018 | Miller et al. |
| 11,286,042 | B2 | * | 3/2022 | Calkins ................... B64C 21/02 |
| 2012/0111011 | A1 | * | 5/2012 | Pike ........................ F02C 7/055 |
| | | | | 60/722 |
| 2016/0245154 | A1 | * | 8/2016 | Thomassin ........... F01C 11/002 |
| 2018/0043986 | A1 | * | 2/2018 | Miller ....................... B64C 7/02 |
| 2018/0208323 | A1 | * | 7/2018 | Parsons ................. B64D 33/02 |
| 2020/0277897 | A1 | * | 9/2020 | O'Brien ................. F02C 7/057 |
| 2021/0215097 | A1 | * | 7/2021 | Gons ...................... F02C 7/055 |
| 2021/0317783 | A1 | * | 10/2021 | Simpson ............... B64D 33/02 |

* cited by examiner

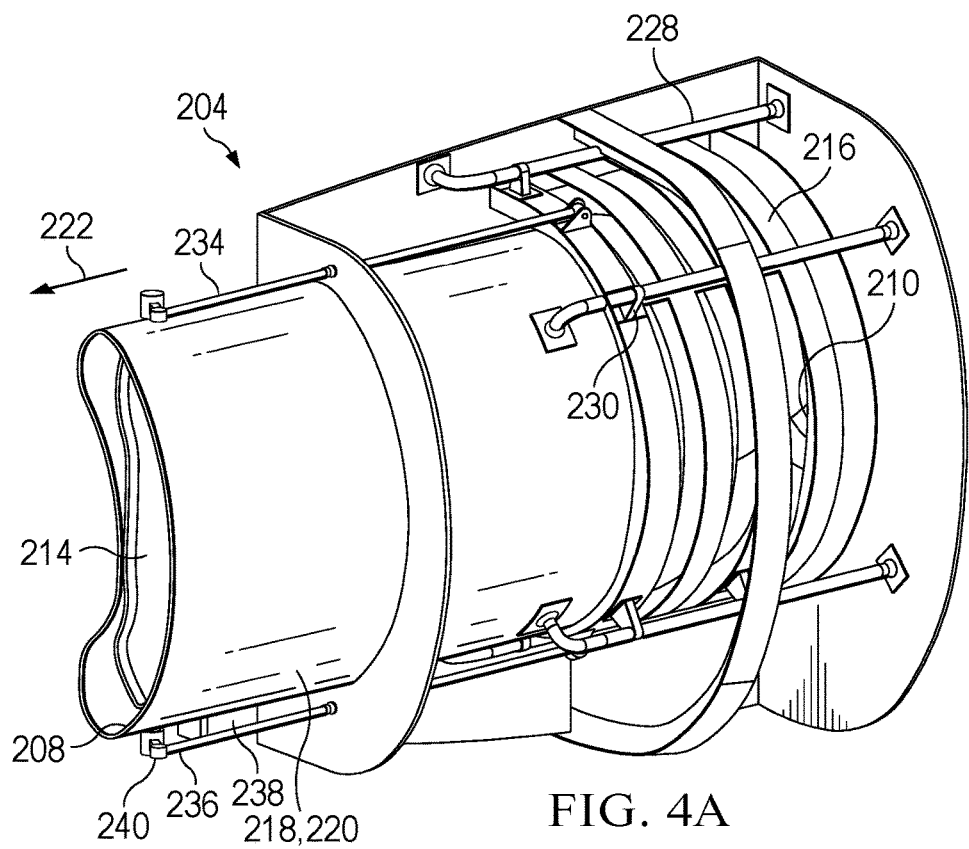
FIG. 4A
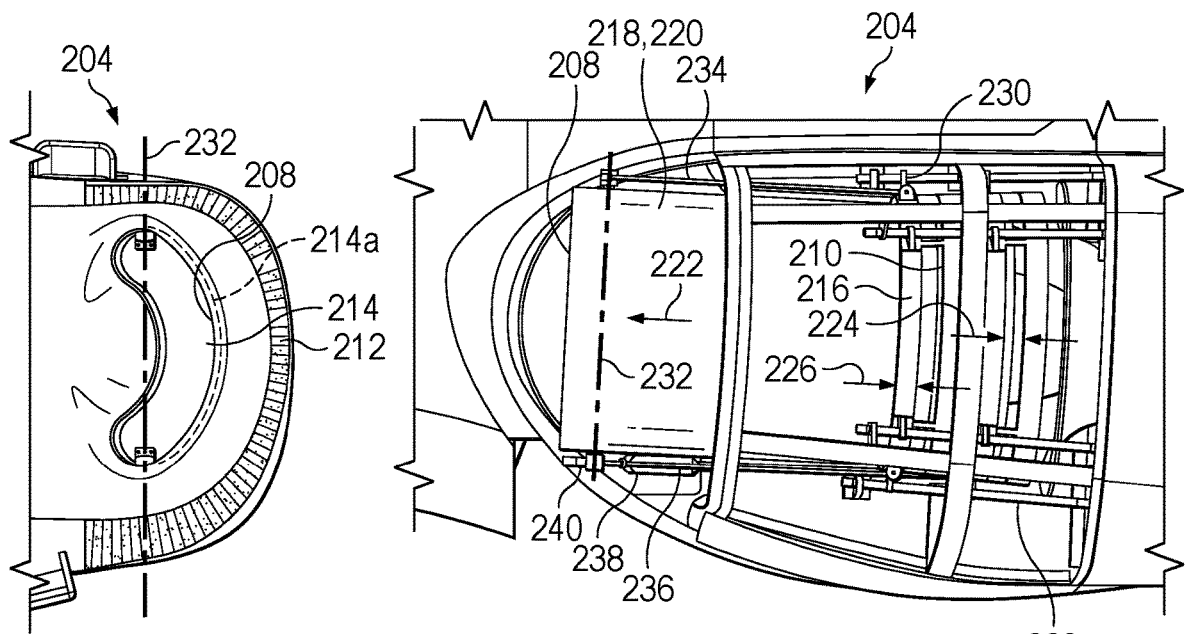
FIG. 4B
FIG. 4C

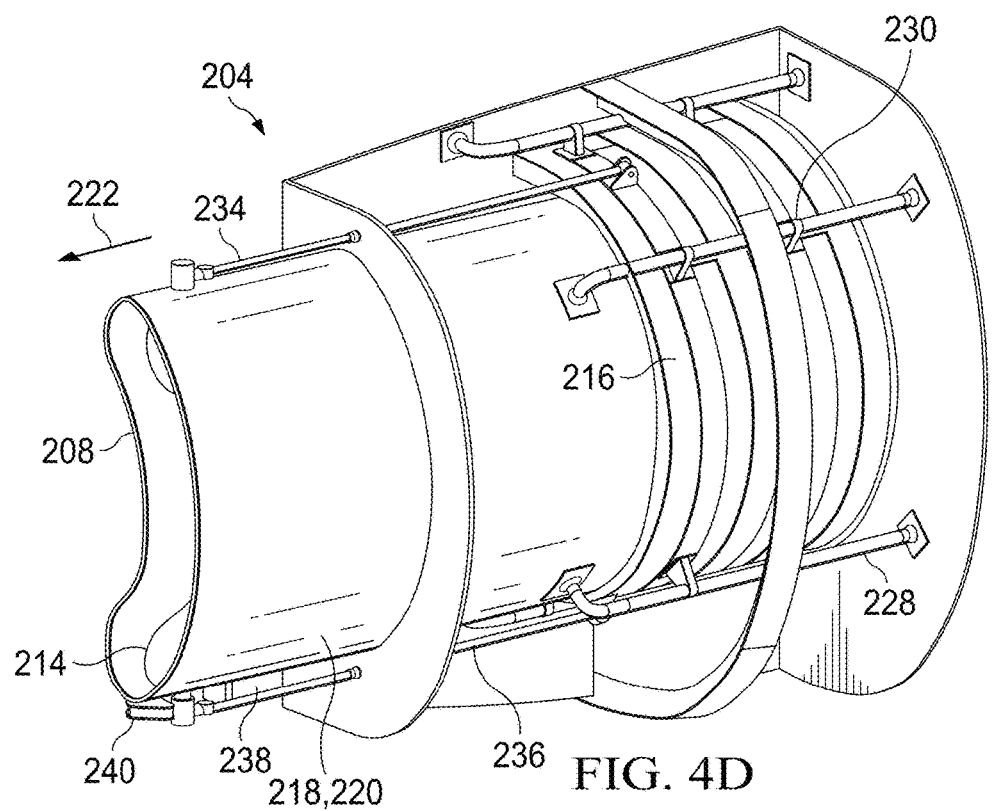
FIG. 4D
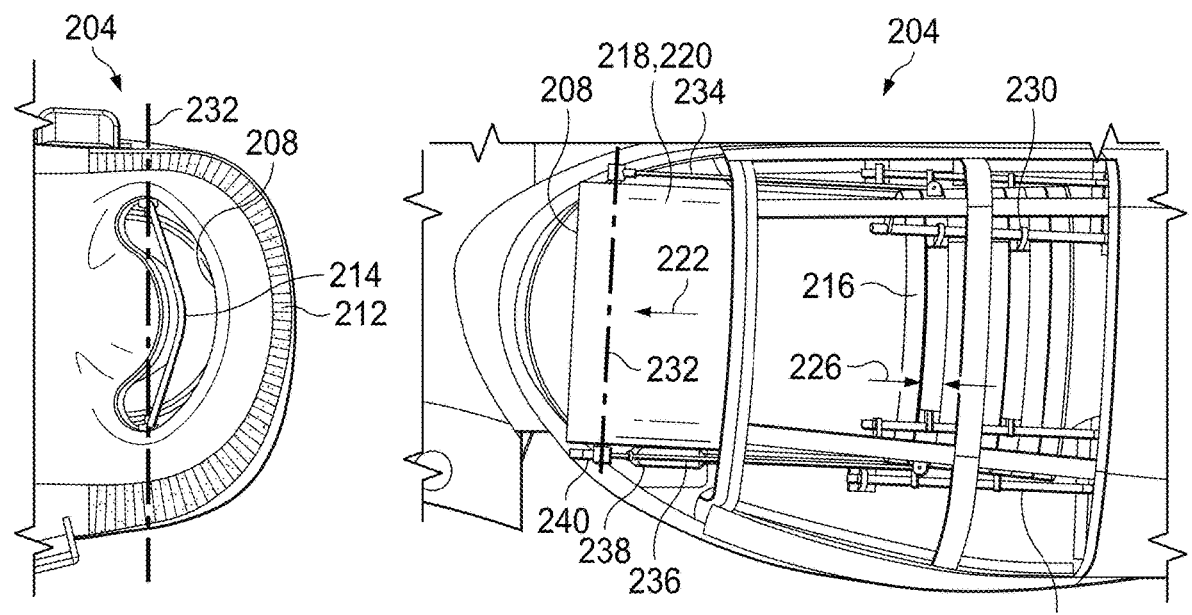
FIG. 4E
FIG. 4F

AIRCRAFT AIR INTAKE SYSTEMS EMPLOYING GILLS

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to air intake systems for use on aircraft and, in particular, to aircraft air intake systems including filtered air inlet slits that are either covered or exposed by movable interconnected gills based on the mode of the air intake system.

BACKGROUND

An air intake system is installed upstream of an aircraft engine to supply air to the engine. Air intake systems often include filters to ensure that the engine receives a clean supply of air. The filtration of air delivered to the engine is particularly important in operational environments having high levels of particulates in the atmosphere. Examples of such operational environments include desert conditions with high levels of sand, freezing conditions with high levels of ice and areas near volcanic ash or forest fires. While air filters are often necessary, air filters can also impede the free flow of air into the engine and therefore are sometimes associated with a performance penalty during flight. Such degradation in performance may reach unacceptable levels in aircraft capable of high forward speeds including vertical takeoff and landing (VTOL) aircraft such as tiltrotor aircraft and compound helicopters. Air intake systems in fast-moving aircraft may therefore be able to switch between delivering unfiltered or filtered air to the engine. Current air intake systems capable of switching between unfiltered and filtered air, however, suffer from several drawbacks. For example, current switchable air intake systems are often highly complex and require a high number of parts such as multiple actuators, thereby reducing the reliability of such systems. Current switchable air intake systems also suffer from inefficiencies that increase the amount of time required to switch between delivering unfiltered and filtered air. In particular, the inlet covers in such systems are often large and must travel long distances to open or close associated air inlets. Current switchable air intake systems are also often poorly designed, resulting in geometries that exacerbate the aforementioned drawbacks. Accordingly, a need has arisen for aircraft air intake systems that address these and other drawbacks of current air intake systems.

SUMMARY

In a first aspect, the present disclosure is directed to an air intake system for an aircraft. The air intake system is switchable between a performance mode and a filtered mode. The air intake system includes a duct forming filtered air inlet slits. The air intake system also includes interconnected gills adjacent to the filtered air inlet slits. The gills are movable between various gill positions including a closed position substantially covering the filtered air inlet slits and an open position substantially exposing the filtered air inlet slits. The air intake system also includes an actuator configured to move the gills into the closed position in the performance mode and the open position in the filtered mode.

In some embodiments, the gills may be slidable along an outer surface of the duct into the various gill positions. In certain embodiments, the air intake system may include one or more guide rails positioned orthogonally to the gills, the gills slidably coupled to the one or more guide rails to guide the gills along the outer surface of the duct. In some embodiments, the outer surface of the duct may be a convex outer surface and the gills may be curved gills to contour the convex outer surface of the duct. In certain embodiments, each curved gill may form a substantially semicircular shape. In some embodiments, the filtered air inlet slits may be parallel and the gills may be parallel. In certain embodiments, the filtered air inlet slits and the gills may extend in a direction transverse to a forward direction of travel of the aircraft.

In some embodiments, the duct may have an inner surface forming a plenum, the gills offset from the inner surface of the duct in each of the various gill positions. In certain embodiments, the duct may form a ram air inlet and the air intake system may include a ram air door movable between various door positions including a closed position to substantially block the ram air inlet in the filtered mode and an open position to receive ram air into the ram air inlet in the performance mode. In some embodiments, the actuator may be configured to synchronously move the gills and the ram air door based on the mode of the air intake system. In certain embodiments, the duct may form the ram air inlet on a forward end of the duct and the filtered air inlet slits on an outboard side of the duct. In some embodiments, the ram air door may be rotatably coupled to the duct in the ram air inlet, the ram air door rotatable in the ram air inlet between the various door positions. In certain embodiments, the ram air inlet and the ram air door may each have a convex outboard side and a concave inboard side.

In some embodiments, the air intake system may include one or more linkages coupling the ram air door to the gills. In certain embodiments, the one or more linkages may include a top linkage disposed adjacent a top side of the duct and a bottom linkage disposed adjacent a bottom side of the duct. In certain embodiments, the ram air door may be rotatable into the various door positions and the gills may be slidable into the various gill positions. In such embodiments, the air intake system may include a bell crank coupling the actuator to the ram air door. Also in such embodiments, the actuator may be a linear actuator, the bell crank converting linear motion of the actuator into rotational motion of the ram air door, the bell crank and the one or more linkages converting the rotational motion of the ram air door into sliding motion of the gills.

In a second aspect, the present disclosure is directed to an aircraft including a fuselage and a propulsion system coupled to the fuselage, the propulsion system including an engine and an air intake system for the engine. The air intake system is switchable between a performance mode and a filtered mode. The air intake system includes a duct forming filtered air inlet slits. The air intake system also includes interconnected gills adjacent to the filtered air inlet slits. The gills are movable between various gill positions including a closed position substantially covering the filtered air inlet slits and an open position substantially exposing the filtered air inlet slits. The air intake system also includes an actuator configured to move the gills into the closed position in the performance mode and the open position in the filtered mode.

In some embodiments, the aircraft may be a tiltrotor aircraft including a wing coupled to the fuselage. In such embodiments, the propulsion system may be left and right propulsion systems coupled to outboard ends of the wing, each propulsion system including a respective air intake system. In certain embodiments, each gill may have a width in a range between 0.5 inches and 4 inches. In some embodiments, the air intake system may include a filter substantially covering the gills and the filtered air inlet slits.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4F are various views of an air intake system switching between a filtered mode and a performance mode in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
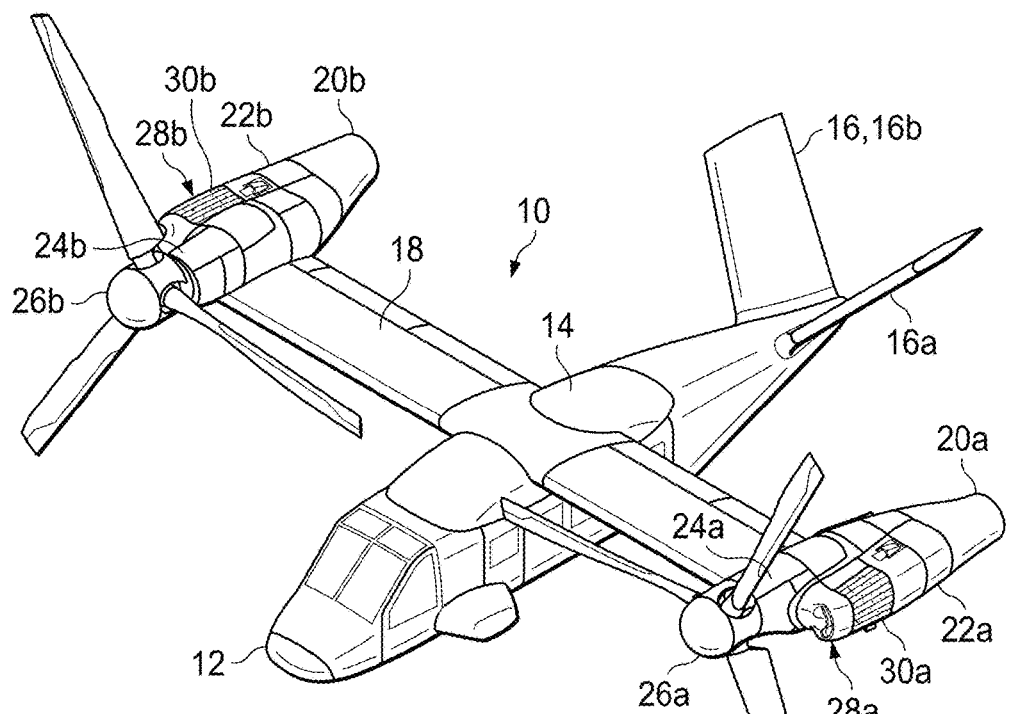
FIGS. 1A-1B are schematic illustrations of a tiltrotor aircraft having dual air intake systems in accordance with embodiments of the present disclosure.
Figure 1B:
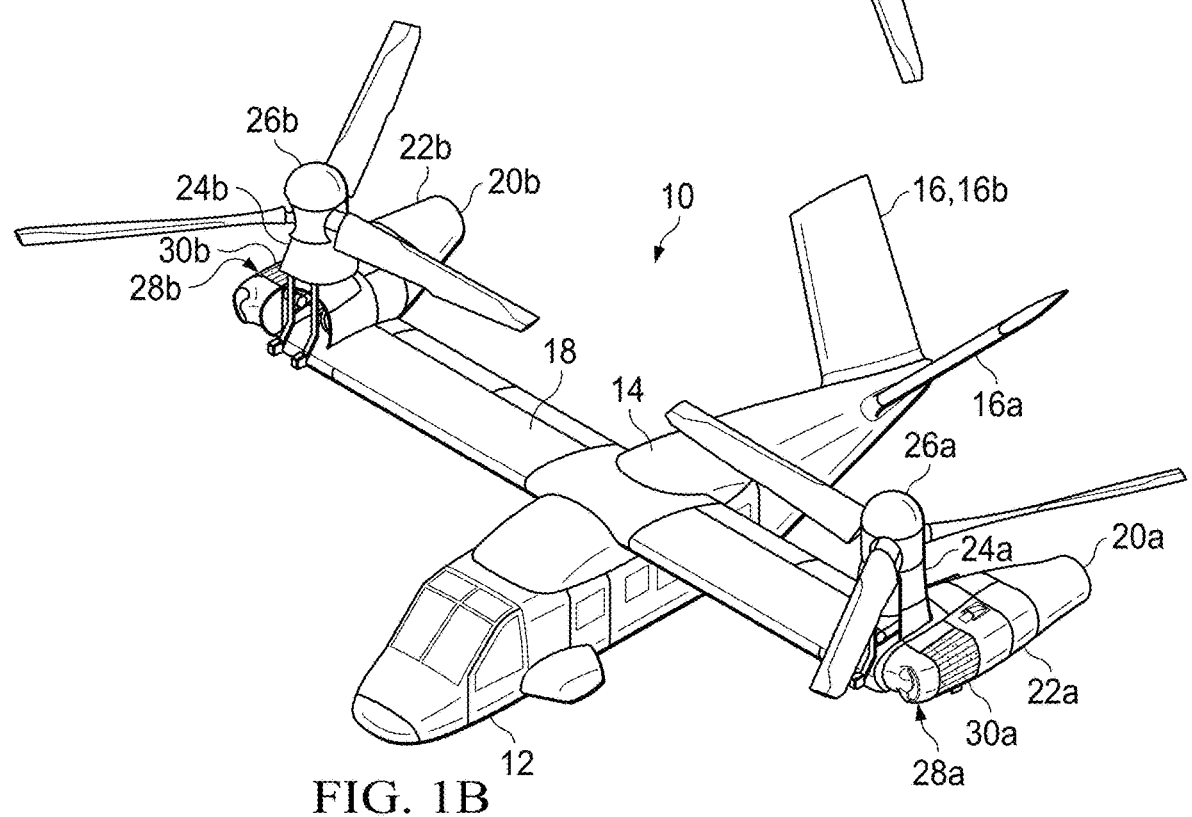

Referring to FIGS. 1A-1B in the drawings, a tiltrotor aircraft is schematically illustrated and generally designated 10. Tiltrotor aircraft 10 includes a fuselage 12, a wing mount assembly 14 and a tail assembly 16 including rotatably mounted tail members 16a, 16b having control surfaces operable for horizontal and/or vertical stabilization during forward flight. A wing assembly 18 is supported by wing mount assembly 14. Coupled to outboard ends of wing assembly 18 are propulsion assemblies 20a, 20b. Propulsion assembly 20a includes a nacelle depicted as fixed pylon 22a that houses an engine and a transmission. Thus, the nacelle is fixed relative to wing assembly 18. In addition, propulsion assembly 20a includes a mast assembly 24a having a mast that is rotatable relative to fixed pylon 22a, wing assembly 18 and fuselage 12 between a generally horizontal orientation, as best seen in FIG. 1A, and a generally vertical orientation, as best seen in FIG. 1B. Propulsion assembly 20a also includes a proprotor assembly 26a, including proprotor blade assemblies radiating therefrom, which is rotatable responsive to torque and rotational energy provided via a rotor hub assembly and drive system mechanically coupled to the engine and transmission housed by fixed pylon 22a. Similarly, propulsion assembly 20b includes a nacelle depicted as fixed pylon 22b that houses an engine and transmission and a mast assembly 24b that is rotatable relative to fixed pylon 22b, wing assembly 18 and fuselage 12. Propulsion assembly 20b also includes a proprotor assembly 26b, including proprotor blade assemblies radiating therefrom, which is rotatable responsive to torque and rotational energy provided via a rotor hub assembly and drive system mechanically coupled to the engine and transmission housed by fixed pylon 22b.

FIG. 1A illustrates tiltrotor aircraft 10 in airplane or forward flight mode, in which proprotor assemblies 26a, 26b are rotating in a substantially vertical plane to provide a forward thrust enabling wing assembly 18 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 26a, 26b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 26a, 26b are selectively positioned between forward flight mode and VTOL flight mode, which can be referred to as a conversion flight mode. Even though tiltrotor aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within fuselage 12 that provides torque and rotational energy to both proprotor assemblies 26a, 26b.

Each propulsion system 20a, 20b includes an air intake system 28a, 28b to deliver air to the engines of propulsion systems 20a, 20b. Air intake systems 28a, 28b are switchable between a performance mode, in which unfiltered ram air is delivered to the engines, and a filtered mode, in which air passes through filters 30a, 30b before being delivered to the engines. Air intake systems 28a, 28b may be manually or automatically switched between the performance and filtered modes. For example, the pilot of tiltrotor aircraft 10 may manually switch air intake systems 28a, 28b between the performance and filtered modes. In other examples, air intake systems 28a, 28b may automatically switch between the performance and filtered modes based on one or more parameters such as the flight mode of tiltrotor aircraft 10 and/or the operational or environmental conditions of tiltrotor aircraft 10. In some embodiments, tiltrotor aircraft 10 includes one or more sensors to detect the operational or environmental conditions of tiltrotor aircraft 10. The switchability of air intake systems 28a, 28b between the performance and filtered modes fulfills the need for the engines of propulsion assemblies 20a, 20b to receive an adequate supply of air in all operational circumstances while also ensuring that the air received by the engines is clean and uncontaminated for use.

It should be appreciated that tiltrotor aircraft 10 is merely illustrative of a variety of aircraft that can implement the embodiments disclosed herein. Indeed, the air intake systems of the illustrative embodiments may be implemented on any aircraft. Other aircraft implementations can include hybrid aircraft, tiltwing aircraft, quad tiltrotor aircraft, unmanned aircraft, gyrocopters, propeller-driven airplanes, helicopters, compound helicopters, co-axial dual rotor system helicopters, jets, drones and the like. As such, those skilled in the art will recognize that the air intake systems of the illustrative embodiments can be integrated into a variety of aircraft configurations. It should be appreciated that even though aircraft are particularly well-suited to implement the embodiments of the present disclosure, non-aircraft vehicles and devices can also implement the embodiments.

Figure 2A:
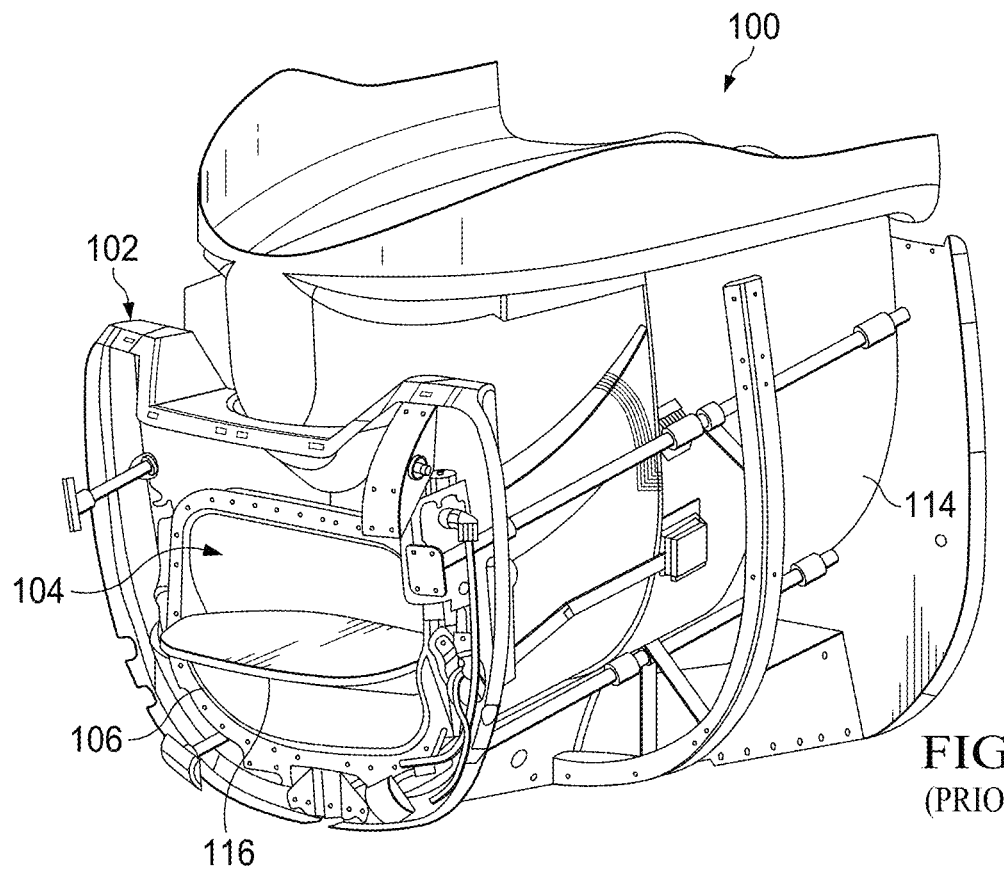
FIGS. 2A-2B are isometric views of an air intake system used in previous aircraft.
Figure 2B:
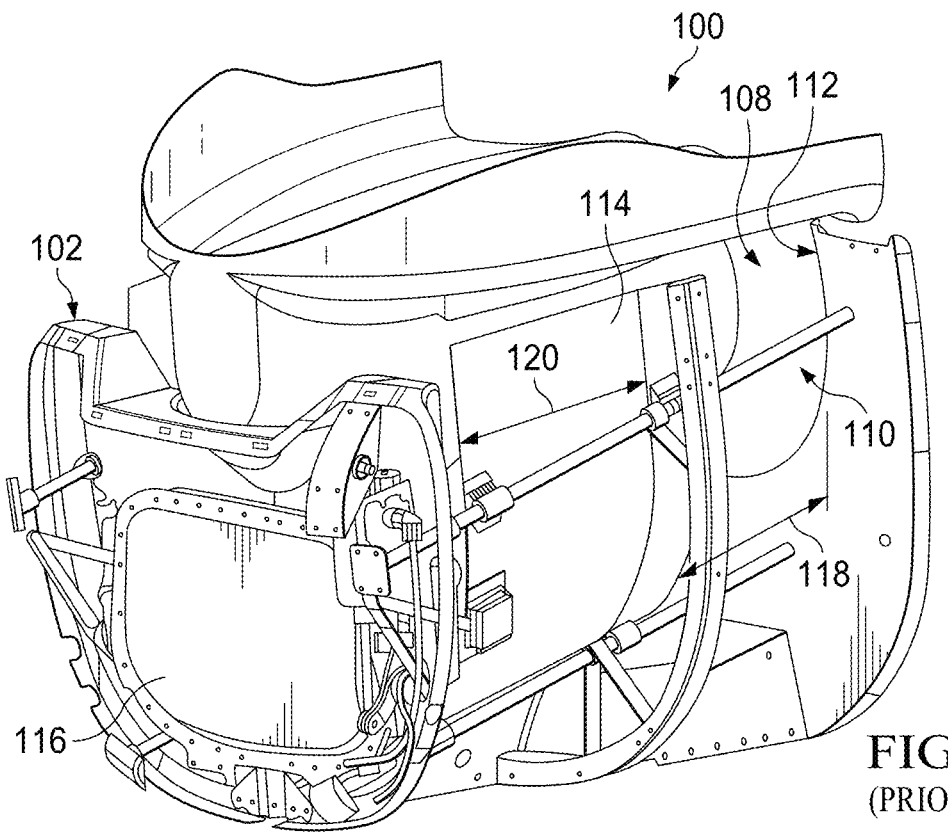

Referring to FIGS. 2A-2B in the drawings, an airflow control system for an engine used in previous vehicles is schematically illustrated and generally designated 100. Airflow control system 100 includes an airflow housing 102 defining an airflow passageway 104 extending between a bypass opening 106 and an intake outlet 108. Airflow housing 102 also defines a duct opening 110 positioned between bypass opening 106 and intake outlet 108. Intake outlet 108 is in fluid communication with an engine intake 112 of the vehicle such that air passes from bypass opening 106 or duct opening 110 to engine intake 112. Airflow control system 100 also includes a movable duct 114 movably connected to airflow housing 102 to selectively allow or prevent air passage through duct opening 110 and into engine intake 112. A bypass door 116 is movably connected to airflow housing 102 to selectively allow or prevent air passage through bypass opening 106 and into engine intake 112. Movable duct 114 moves between the closed position shown in FIG. 2A and the open position shown in FIG. 2B. Airflow control system 100 relies upon a single movable duct 114 to open and close duct opening 110. Additionally, duct opening 110 and movable duct 114 are both large such that movable duct 114 must travel a long distance 118 to open or close duct opening 110. For example, duct opening 110 may be 8 inches or more and movable duct 114 may have a width 120 of 8 inches or more, resulting in travel distance 118 being at least 8 inches. Large travel distances increase the amount of time required for airflow control system 100 to open and close duct opening 110, causing airflow control system 100 to be less efficient.

Figure 3A:
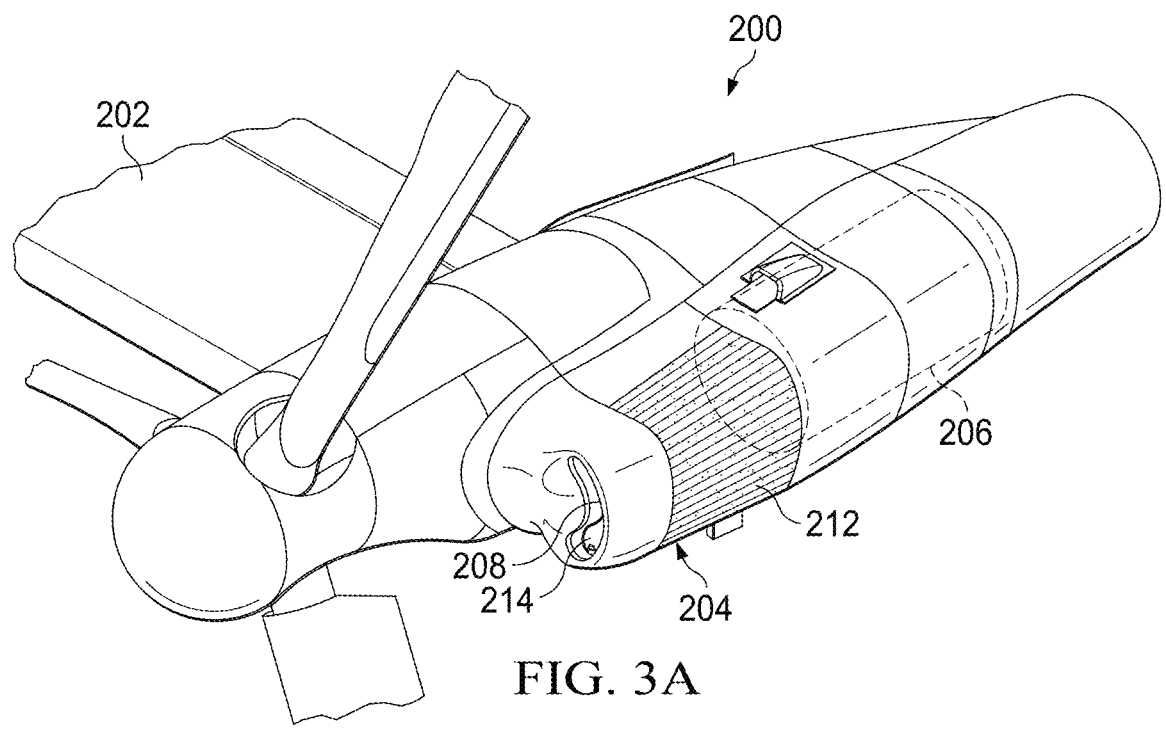
FIGS. 3A-3B are isometric views of an air intake system for a propulsion assembly of a tiltrotor aircraft in accordance with embodiments of the present disclosure.
Figure 3B:
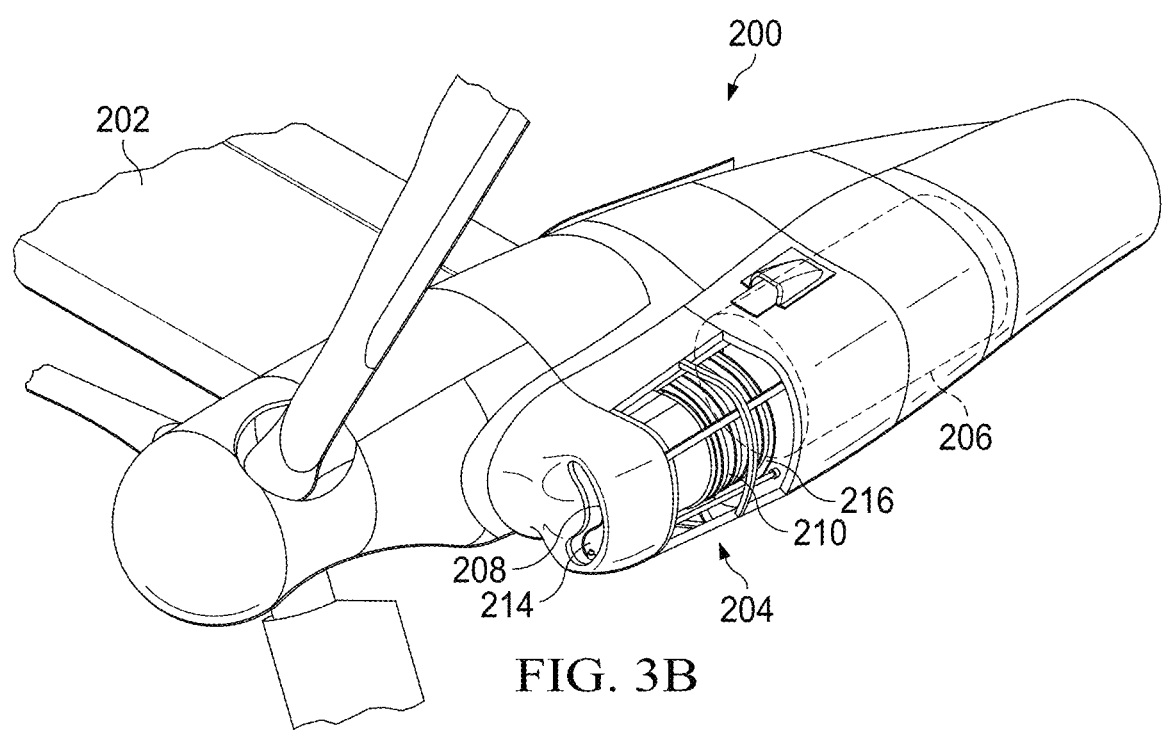

Referring to FIGS. 3A-3B in the drawings, a propulsion system for a tiltrotor aircraft such as tiltrotor aircraft 10 in FIGS. 1A-1B is schematically illustrated and generally designated 200. Propulsion system 200 is coupled to an outboard end of wing assembly 202. Similar to tiltrotor aircraft 10 in FIGS. 1A-1B, a second propulsion assembly such as propulsion assembly 20b may be coupled to the opposing end of wing assembly 202. Propulsion assembly 200 is substantially similar to the propulsion assembly on the opposing end of wing assembly 202 therefore, for sake of efficiency, certain features will be disclosed only with regard to propulsion assembly 200. One having ordinary skill in the art, however, will fully appreciate an understanding of the propulsion assembly on the opposing end of wing assembly 202 based on the disclosure herein of propulsion assembly 200.

Propulsion system 200 includes air intake system 204, which supplies air received from the atmosphere to engine 206. Air intake system 204 includes two inlet areas for receiving air from the atmosphere, namely, a ram air inlet 208 and filtered air inlet slits 210. Ram air inlet 208 receives and delivers unfiltered air to engine 206. Filtered air inlet slits 210 receive filtered air that has passed through an inlet barrier filter 212 and delivers the filtered air to engine 206. Inlet barrier filter 212 filters air from the atmosphere to remove dust, sand, moisture, ice, salt or other particulates to improve the reliability of engine 206. For purposes of illustration, inlet barrier filter 212 has been removed in FIG. 3B to show underlying components of air intake system 204 including filtered air inlet slits 210. Inlet barrier filter 212 is curved to contour the general shape of propulsion system 200, although in other embodiments inlet barrier filter 212 may be flat or any other shape. Air intake system 204 includes a ram air door 214 to selectively open and close ram air inlet 208. Air intake system 204 also includes gills 216, which are adjacent to filtered air inlet slits 210 and covered by inlet barrier filter 212, to selectively open and close filtered air inlet slits 210. Using ram air door 214 and gills 216, air intake system 204 may selectively supply unfiltered and/or filtered air to engine 206 based on one or more factors such as ambient conditions or the flight mode of the aircraft.

Referring to FIGS. 4A-4F in conjunction with FIGS. 3A-3B in the drawings, the structure and various modes of air intake system 204 are shown in greater detail. More particularly, FIGS. 4A-4C show air intake system 204 in filtered mode and FIGS. 4D-4F show air intake system 204 in performance mode. Filtered air inlet slits 210 are formed on the outboard side of a duct 218 of air intake system 204. In particular, filtered air inlet slits 210 are formed on an outboard convex outer surface 220 of duct 218 such that filtered air inlet slits 210 curve around the outboard side of duct 218 from at or near the top to at or near the bottom of duct 218. Filtered air inlet slits 210 are generally parallel and extend in a direction transverse to a forward direction of travel 222 of the aircraft. Filtered air inlet slits 210 also have generally uniform widths 224. In other embodiments, filtered air inlet slits 210 may be located on other areas of duct 218 such as the inboard side of duct 218. In yet other embodiments, filtered air inlet slits 210 may be nonparallel, have nonuniform widths and may extend in one or more directions other than a direction transverse to forward direction of travel 222 of the aircraft. Filtered air inlet slits 210 may also each form alternative uniform or nonuniform shapes such as circles or perforations.

Adjacent to filtered air inlet slits 210 are a plurality of interconnected gills 216 that move in unison with one another. Gills 216 are slidable along convex outer surface 220 of duct 218 into an infinite number of gill positions. FIGS. 4A-4C show gills 216 in the open position exposing filtered air inlet slits 210 such that air may enter filtered air inlet slits 210 substantially unobstructed. FIGS. 4D-4F show gills 216 in the closed position in which gills 216 substantially cover filtered air inlet slits 210, thereby blocking air from entering filtered air inlet slits 210. Gills 216 are curved to contour convex outer surface 220 on the outboard side of duct 218, resulting in a generally semicircular shape that wraps around the outboard side of duct 218. Similar to filtered air inlet slits 210, gills 216 are parallel and extend in a direction transverse to forward direction of travel 222 of the aircraft, although in other embodiments gills 216 may be nonparallel and/or extend in other directions. Gills 216 have a uniform width 226 and are shaped as strips so as to cover filtered air inlet slits 210 in the closed position. In other embodiments, however, gills 216 may have nonuniform widths and/or other shapes that also cover filtered air inlet slits 210 in the closed position. In one non-limiting example, filtered air inlet slits 210 and/or gills 216 may each have a width 224, 226, respectively, in a range between 0.5 inches and 4 inches such as about 2 inches. Widths 224, 226 of filtered air inlet slits 210 and gills 216 may vary widely, however, depending upon the air intake needs of the aircraft. Air intake system 204 may also include any number of filtered air inlet slits 210 and/or gills 216 depending upon the air intake needs of the aircraft such as 2, 3, 4, 7, 10, 20 or more filtered air inlet slits 210 and/or gills 216. Gills 216 may be formed from any material capable of blocking air from entering filtered air inlet slits 210.

Air intake system 204 includes guide rails 228 adjacent to convex outer surface 220 of duct 218 and positioned orthogonally to filtered air inlet slits 210 and gills 216. Gills 216 are slidably coupled to guide rails 228 via guide fittings 230 on one or more of gills 216. Guide rails 228 guide gills 216 along convex outer surface 220 in a single linear path between the open and closed positions, which reduces the overall complexity of air intake system 204. Guide rails 228 also function to constrain the movement of gills 216 along a linear fore-aft path. In the illustrated embodiment, air intake system 204 includes four guide rails 228, although in other embodiments air intake system 204 may include any number of guide rails such as 1, 2, 3, 5 or more guide rails.

The forward end of duct 218 forms ram air inlet 208. Ram air door 214 is rotatably coupled to the forward end of duct 218 in ram air inlet 208, although in other embodiments ram air door 214 may be external to ram air inlet 208. Ram air door 214 is rotatable about a vertical pivot axis 232. In other embodiments, ram air door 214 may be rotatable about a nonvertical pivot axis such as a horizontal pivot axis. Ram air inlet 208 and ram air door 214 have complementary curved shapes so that ram air door 214 fits in ram air inlet 208 and also effectively blocks air from entering ram air inlet 208 in the closed position. In the illustrated embodiment, ram air inlet 208 and ram air door 214 each have a convex outboard side and a concave inboard side. For example, ram air door 214 has convex outboard side 214a. It will be appreciated, however, that ram air inlet 208 and ram air door 214 may have any shape depending on the geometry of air intake system 204 and the air intake needs of the aircraft. Ram air door 214 is rotatable in ram air inlet 208 between an infinite number of door positions. FIGS. 4A-4C show ram air door 214 in the closed position to substantially block air from entering ram air inlet 208. FIGS. 4D-4F show ram air door 214 in the open position so that ram air is received into ram air inlet 208. In other embodiments, ram air door 214 may be slidable, instead of rotatable, between the open and closed positions. Ram air door 214 is coupled to gills 216 via one or more linkages 234, 236. More particularly, ram air door 214 is coupled to gills 216 by top linkage 234 disposed adjacent the top side of duct 218 and bottom linkage 236 disposed adjacent the underside of duct 218.

Air intake system 204 includes an actuator 238 on the underside of duct 218, although actuator 238 may be located anywhere on air intake system 204. Actuator 238 is coupled to ram air door 214 via a bell crank 240. In the illustrated embodiment, actuator 238 is a linear actuator and bell crank 240 converts the linear motion of actuator 238 into the rotational motion of ram air door 214. Bell crank 240 and linkages 234, 236 convert the rotational motion of ram air door 214 into the sliding motion of gills 216. In this configuration, ram air door 214 and gills 216 move in an inverse direction from one another such that ram air door 214 opens while gills 216 close and ram air door 214 closes while gills 216 open. The rotating motion of ram air door 214 and the sliding motion of gills 216 are accomplished in the illustrative embodiments using a single actuator, namely actuator 238, thereby reducing the number of parts required by air intake system 204. In other embodiments, however, air intake system 204 may use two or more actuators, such as one actuator to rotate ram air door 214 and another actuator to slide gills 216.

Air intake system 204 is switchable between the filtered mode shown in FIGS. 4A-4C and the performance mode shown in FIGS. 4D-4F. In the filtered mode, actuator 238 rotates ram air door 214 into the closed position and slides gills 216 into the open position. Thus, engine 206 receives filtered air that has passed through filter 212 and filtered air inlet slits 210. In the performance mode, actuator 238 rotates ram air door 214 into the open position and slides gills 216 into the closed position so that engine 206 receives unfiltered air via ram air inlet 208. In addition, actuator 238 may move ram air door 214 and gills 216 into intermediate positions between the filtered mode and the performance mode such that ram air door 214 and gills 216 are both partially open simultaneously. Air intake system 204 has a simplified design that allows a single actuator to synchronously move ram air door 214 and gills 216 based on the mode of air intake system 204. Interconnected gills 216 that have relatively narrow widths 226 allow filtered air inlet slits 210 to be fully opened or closed over a short travel distance instead of requiring a large movement as in previous air intake systems such as airflow control system 100 in FIGS. 2A-2B.

Figure 5B:
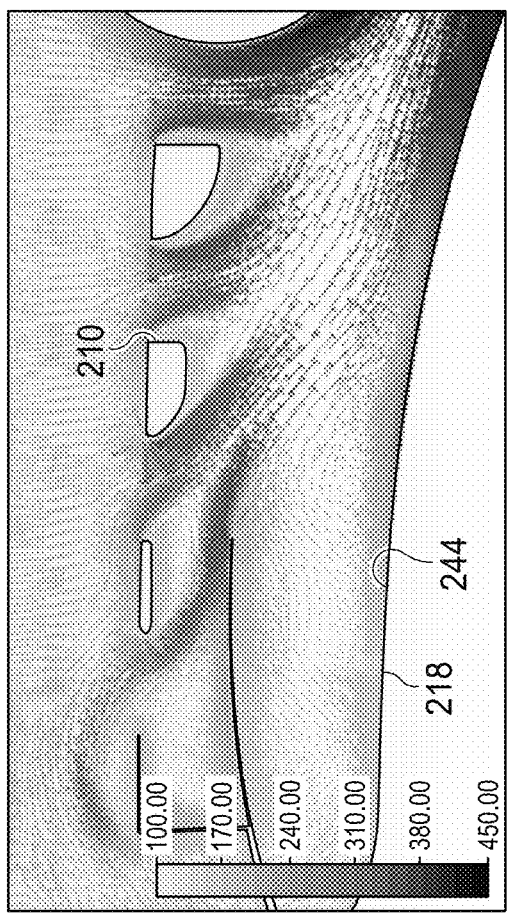
FIGS. 5A-5C are cross-sectional views illustrating airflow patterns through an air intake system in a filtered mode and a performance mode in accordance with embodiments of the present disclosure.
Figure 5C:
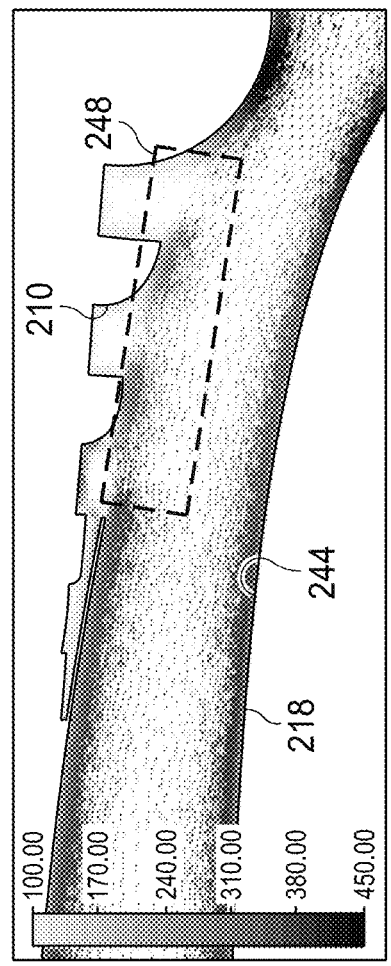
Figure 5A:
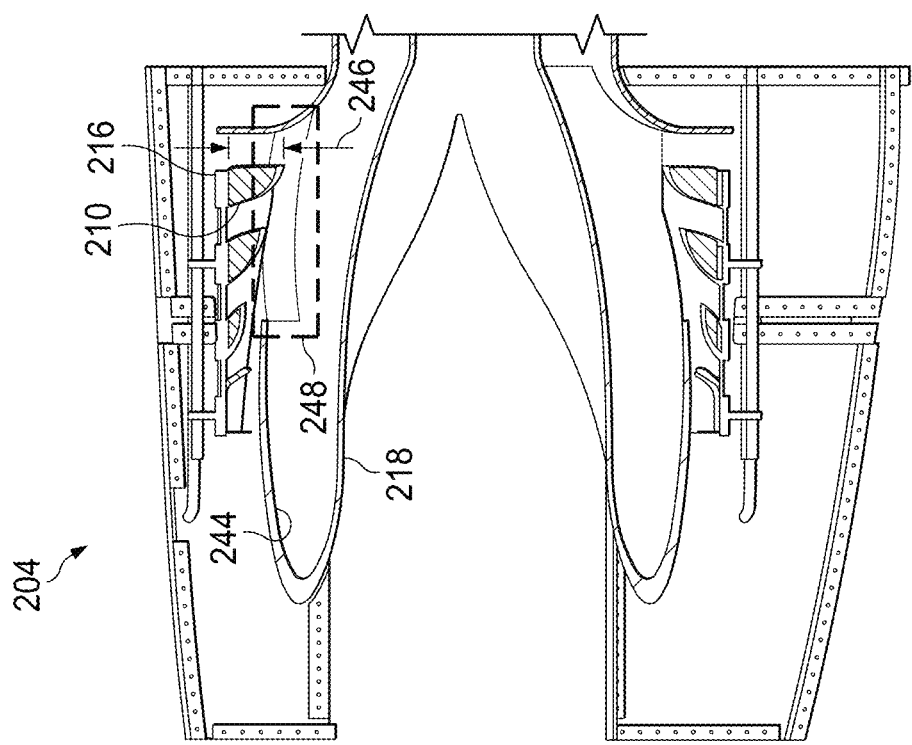

Referring additionally to FIGS. 5A-5C in the drawings, cross-sectional views of air intake system 204 are shown to illustrate the flow of air therethrough in the various modes of air intake system 204. FIG. 5A is a cross-sectional view of air intake system 204 looking in the inboard direction through the centerline of engine 206. FIG. 5B is a visual representation of airflow density through filtered air inlet slits 210 in the filtered mode. FIG. 5C is a visual representation of airflow density through a plenum 244 formed by the inner surface of duct 218 in the performance mode. FIGS. 5B-5C illustrate that the large radii of the plenum walls alleviate flow separation and promote a less distorted flow environment for engine 206. In addition, each gill 216 is offset from the inner surface of duct 218 by a respective offset distance 246. Gills 216 are offset from the inner surface of duct 218 in both the open and closed positions. Because gills 216 are offset from the inner surface of duct 218, plenum 244 includes a "ski jump" area 248 over which air flows in the performance mode. Gills 216 are not required to form part of the plenum surface when air intake system 204 is in the performance mode, which reduces the cost and complexity of air intake system 204 and simplifies the overall geometry. Previous air intake systems such as airflow control system 100 in FIGS. 2A-2B require a door such as movable duct 114 to create a surface of the plenum along which air moves when the door is closed.

Figure 6D:
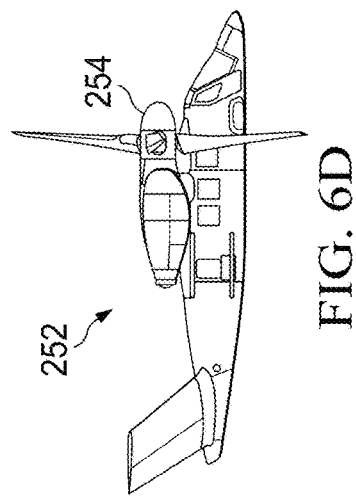
FIGS. 6A-6H are schematic illustrations of a tiltrotor aircraft having dual air intake systems in a sequential flight operating scenario in accordance with embodiments of the present disclosure.
Figure 6C:
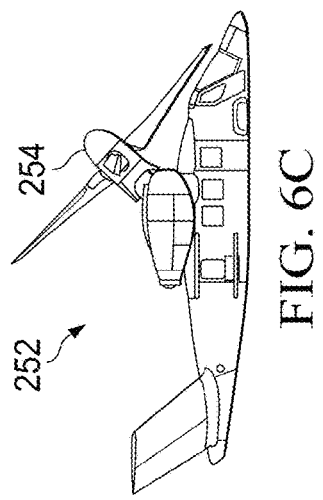
Figure 6B:
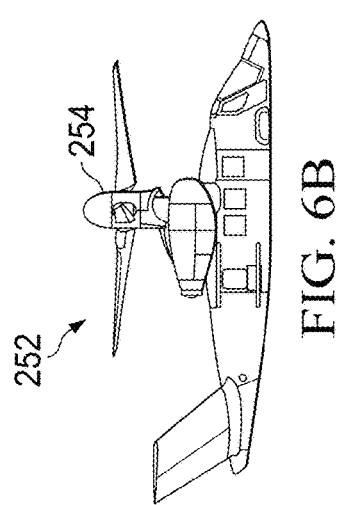
Figure 6A:
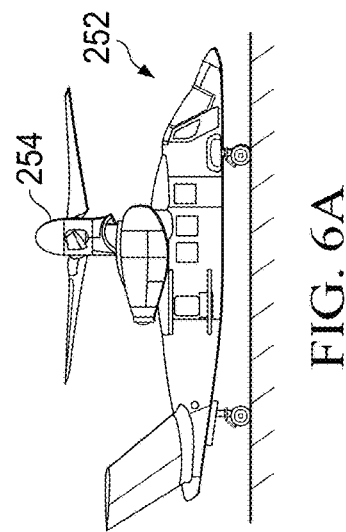

Referring additionally to FIGS. 6A-6H in the drawings, a sequential flight-operating scenario of tiltrotor aircraft 252 including dual propulsion systems 254, which includes propulsion system 200, and an on-board flight control computer is depicted. Propulsion systems 254 include port and starboard propulsion systems coupled to the outboard ends of a wing assembly. As best seen in FIG. 6A, tiltrotor aircraft 252 is positioned on the ground prior to takeoff. When tiltrotor aircraft 252 is ready for a mission, the flight control computer commences operations to provide flight control to tiltrotor aircraft 252 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne flight and thrust-borne flight.

As best seen in FIG. 6B, tiltrotor aircraft 252 has performed a vertical takeoff and is engaged in thrust-borne lift. As illustrated, the proprotor assemblies of each propulsion system 254 are rotating in the same horizontal plane. As the longitudinal axis and the lateral axis of tiltrotor aircraft 252 are both in the horizontal plane, tiltrotor aircraft 252 has a level flight attitude. During hover, the flight control computer utilizes individual variable speed and blade pitch control capability of propulsion systems 254 to control flight dynamics to maintain hover stability and to provide pitch, roll and yaw authority for tiltrotor aircraft 252. In some implementations, each propulsion system 254 may be independently controllable such that operational changes to either propulsion system 254 enable pitch, roll and yaw control of tiltrotor aircraft 252 during VTOL operations. When tiltrotor aircraft 252 is in a hover configuration, the increased downward wind speed at lower altitudes may produce additional debris and sediment that could affect the engine intake if not filtered out of the intake air. Therefore, the air intake system of each propulsion system 254 may switch to filtered mode so that the engines associated therewith receive filtered air. The air intake systems of propulsion systems 254 may also switch to filtered mode in the presence of high-particulate atmospheric conditions. For example, filtered mode may be used in icy or freezing conditions to prevent ice from entering the engines or in sandy desert conditions. In low-particulate atmospheric conditions, the air intake systems of propulsion systems 254 may remain in performance mode so that air may enter the engines unobstructed by air filters. In some embodiments, the air intake systems of propulsion systems 254 may be in performance mode by default and switch to filtered mode only if the air intake systems are manually or automatically switched to filtered mode for a particular reason such as high-particulate atmospheric conditions or a change in the flight mode of tiltrotor aircraft 252.

Returning to the sequential flight-operating scenario of tiltrotor aircraft 252, after vertical ascent to the desired elevation, tiltrotor aircraft 252 may begin the transition from thrust-borne lift to wing-borne lift. As best seen from the progression of FIGS. 6B-6D, the angular positions of propulsion systems 254 are changed by a pitch down rotation to transition tiltrotor aircraft 252 from the VTOL flight mode toward the forward flight mode. As seen in FIG. 6C, propulsion systems 254 have been collectively inclined about 45 degrees pitch down. In the conversion orientations of tiltrotor aircraft 252, a portion of the thrust generated by propulsion systems 254 provides lift while a portion of the thrust generated by propulsion systems 254 urges tiltrotor aircraft 252 to accelerate in the forward direction such that the forward airspeed of tiltrotor aircraft 252 increases allowing the wings of tiltrotor aircraft 252 to offload a portion and eventually all of the lift requirement from propulsion systems 254. The air intake systems of propulsion systems 254 may be in either filtered mode or performance mode in the conversion orientations of tiltrotor aircraft 252.

Figure 6E:
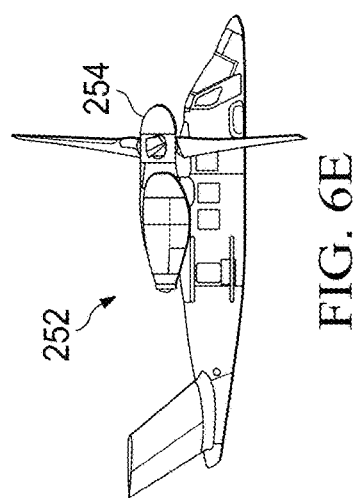

As best seen in FIGS. 6D-6E, propulsion systems 254 have been collectively inclined about 90 degrees pitch down such that the proprotor assemblies are rotating in vertical planes providing forward thrust for tiltrotor aircraft 252 while the wings provide lift. As forward flight with wing-borne lift requires significantly less thrust than VTOL flight with thrust-borne lift, the operating speed of propulsion systems 254 may be reduced particularly in embodiments having collective pitch control. In the forward flight mode, the independent rotor control provided by the flight control computer over each propulsion system 254 may provide yaw authority for tiltrotor aircraft 252. In the forward flight mode, pitch and roll authority is preferably provided by the ailerons and/or elevators on the wings and/or tail assembly of tiltrotor aircraft 252.

In some implementations, tiltrotor aircraft 252 may need high speed unfiltered air in the forward flight mode to meet performance thresholds, and thus the air intake systems of propulsion systems 254 may be in performance mode. In the forward flight mode, the ram air inlets of the air intake systems may be opened to maximize the amount of air passing to the engines and the gills may be closed to prevent leakage or backdraft of air passing between the ram air inlets and the engines. For example, closing the gills prevents excess air from exiting back out through the filters and prevents spillage, which causes drag and reduces aircraft performance and range. Because tiltrotor aircraft 252 is at a cruising speed and altitude, the air intake systems may not necessarily require air to pass through a filter, as may be needed in the VTOL flight mode. Even in forward flight mode, however, tiltrotor aircraft 252 may convert to the filtered mode in some operational circumstances, and thus filtered mode may be implemented in either VTOL or forward flight mode.

Figure 6F:
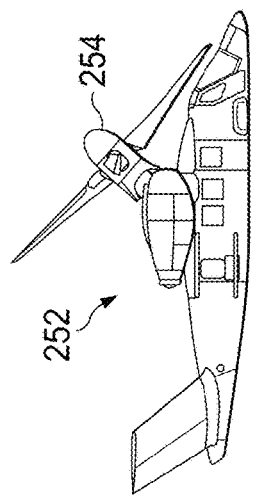
Figure 6G:
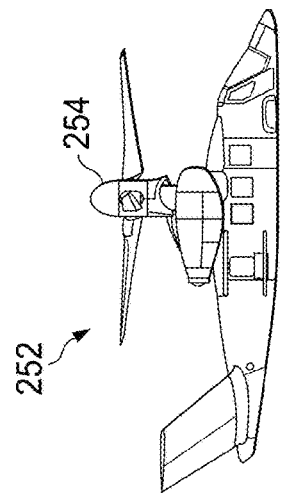
Figure 6H:
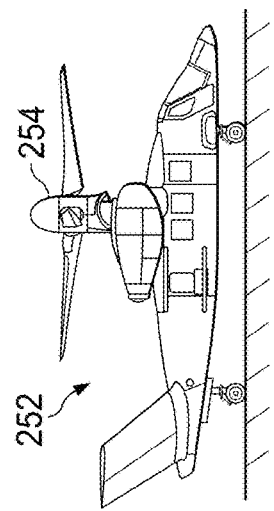

As tiltrotor aircraft 252 approaches its destination, tiltrotor aircraft 252 may begin its transition from wing-borne lift to thrust-borne lift. As best seen from the progression of FIGS. 6E-6G, the angular positions of propulsion systems 254 are changed by a pitch up rotation to transition tiltrotor aircraft 252 from the forward flight mode toward the VTOL flight mode. As seen in FIG. 6F, propulsion systems 254 have been collectively inclined about 45 degrees pitch up. In the conversion orientations of tiltrotor aircraft 252, a portion of the thrust generated by propulsion systems 254 begins to provide lift for tiltrotor aircraft 252 as the forward airspeed decreases and the lift producing capability of the wings of tiltrotor aircraft 252 decreases. As best seen in FIG. 6G, propulsion systems 254 have been collectively inclined about 90 degrees pitch up such that the proprotor assemblies are rotating in the horizontal plane providing thrust-borne lift for tiltrotor aircraft 252. Once tiltrotor aircraft 252 has completed the transition to the VTOL flight mode, tiltrotor aircraft 252 may commence its vertical descent to a surface and may, in some operational circumstances, switch to filtered mode as tiltrotor aircraft 252 decreases in altitude. As best seen in FIG. 6H, tiltrotor aircraft 252 has landed at the destination location.

Figure 7:
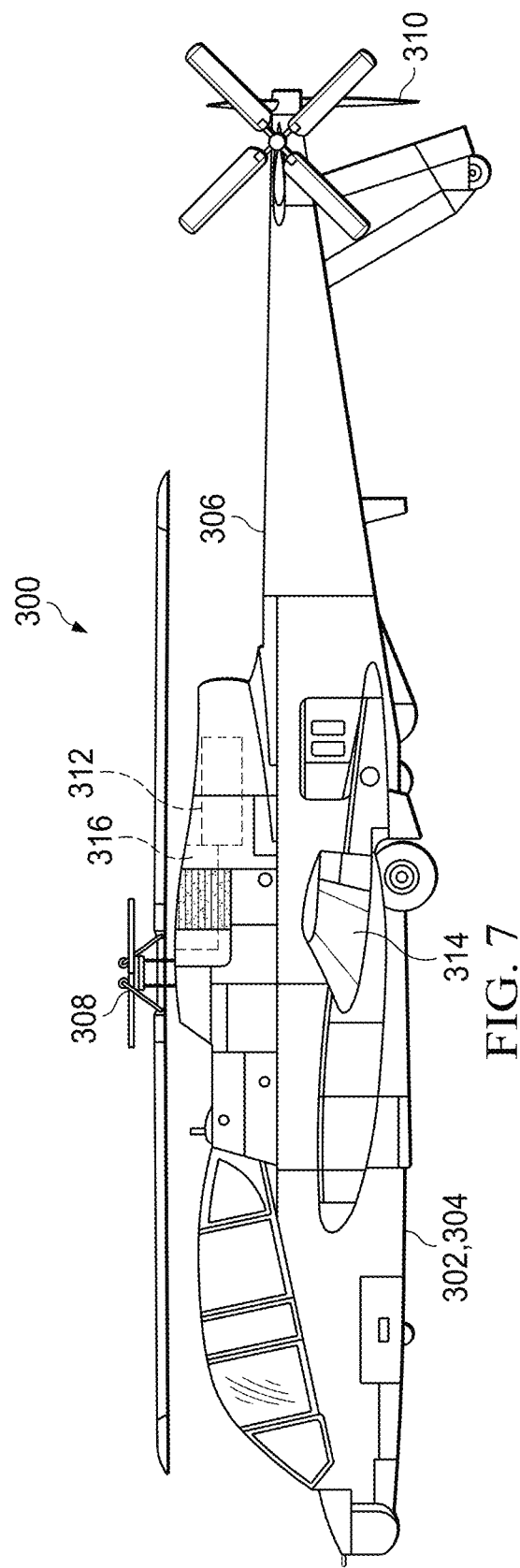
FIG. 7 is a schematic illustration of a compound helicopter having an air intake system in accordance with embodiments of the present disclosure.

Referring to FIG. 7 in the drawings, a compound helicopter capable of vertical takeoff and landing is schematically illustrated and generally designated 300. Compound helicopter 300 includes a fuselage 302 supported by a fuselage airframe 304. A tailboom 306 extends aft of fuselage 302. Compound helicopter 300 has a single main rotor system 308 having any number of rotor blades. In other embodiments, compound helicopter 300 may have a co-axial dual main rotor system. Compound helicopter 300 has a translational thrust system located at the aft end of tailboom 306 including a pusher propeller 310 that propels compound helicopter 300 in a forward direction. Assisted by pusher propeller 310, compound helicopter 300 may be capable of high forward airspeed. By providing for propulsion for compound helicopter 300, pusher propeller 310 may reduce the drag burden on rotor system 308. Pusher propeller 310 may be a variable pitch pusher propeller and may be clutchable. Pusher propeller 310 may be powered by an engine 312 via a gearbox. While shown in the context of a pusher propeller configuration, it will be understood by one of ordinary skill that pusher propeller 310 may also be a more conventional puller propeller or could be variably facing so as to provide yaw control in addition to or instead of translational thrust. Compound helicopter 300 also includes a wing 314. Wing 314 provides additional lift for compound helicopter 300 in forward flight, further alleviating the lift burden on rotor system 308. Compound helicopter 300 includes one or more air intake systems 316, which may include the same, similar or any combination of features presented herein for air intake system 204 in FIGS. 3A-6H. Indeed, the air intake systems of the illustrative embodiments may be particularly useful on any aircraft capable of high forward airspeeds such as compound helicopter 300 or co-axial dual main rotor system helicopters. Thus, compound helicopter 300 is one example of the wide variety of aircraft that may implement the illustrative embodiments described herein.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An air intake system for an engine of an aircraft, the air intake system switchable between a performance mode and a filtered mode, the air intake system comprising:
    a duct forming a plurality of filtered air inlet slits including a first filtered air inlet slit and a second filtered air inlet slit;
    a plurality of interconnected gills including a first gill and a second gill adjacent to the filtered air inlet slits, the gills movable between a plurality of gill positions including a closed position covering the filtered air inlet slits and an open position exposing the filtered air inlet slits; and
    an actuator configured to slide the gills aft with respect to the engine into the closed position in the performance mode and forward with respect to the engine into the open position in the filtered mode;
    wherein, the first filtered air inlet slit is forward of the second filtered air inlet slit and the first gill is forward of the second gill.

2. The air intake system as recited in claim 1 wherein the duct has an outer surface, the gills slidable along the outer surface of the duct into the plurality of gill positions.

3. The air intake system as recited in claim 2 further comprising one or more guide rails positioned orthogonally to the gills, the gills slidably coupled to the one or more guide rails to guide the gills along the outer surface of the duct.

4. The air intake system as recited in claim 2 wherein the outer surface of the duct comprises a convex outer surface; and
    wherein, the gills comprise curved gills to contour the convex outer surface of the duct.

5. The air intake system as recited in claim 4 wherein each curved gill forms a semicircular shape.

6. The air intake system as recited in claim 1 wherein the filtered air inlet slits are parallel and the gills are parallel.

7. The air intake system as recited in claim 1 wherein the filtered air inlet slits and the gills extend in a direction transverse to a forward direction of travel of the aircraft.

8. The air intake system as recited in claim 1 wherein the duct has an inner surface forming a plenum, the gills offset from the inner surface of the duct in each of the plurality of gill positions.

9. The air intake system as recited in claim 1 wherein the duct forms a ram air inlet, further comprising:
    a ram air door movable between a plurality of door positions including a closed position to block the ram air inlet in the filtered mode and an open position to receive ram air into the ram air inlet in the performance mode.

10. The air intake system as recited in claim 9 wherein the actuator is configured to synchronously move the gills and the ram air door based on the mode of the air intake system.

11. The air intake system as recited in claim 9 wherein the actuator consists of a single actuator to synchronously move both the gills and the ram air door based on the mode of the air intake system.

12. The air intake system as recited in claim 9 wherein the duct forms the ram air inlet on a forward end of the duct and the filtered air inlet slits on an outboard side of the duct.

13. The air intake system as recited in claim 9 wherein the ram air door is rotatably coupled to the duct in the ram air inlet, the ram air door rotatable in the ram air inlet between the plurality of door positions.

14. The air intake system as recited in claim 9 wherein the ram air inlet and the ram air door each have a convex outboard side and a concave inboard side.

15. The air intake system as recited in claim 9 further comprising one or more linkages coupling the ram air door to the gills.

16. The air intake system as recited in claim 15 wherein the one or more linkages comprise a top linkage disposed adjacent a top side of the duct and a bottom linkage disposed adjacent a bottom side of the duct.

17. The air intake system as recited in claim 15 wherein the ram air door is rotatable into the plurality of door positions and the gills are slidable into the plurality of gill positions, further comprising:
   a bell crank coupling the actuator to the ram air door;
   wherein, the actuator comprises a linear actuator, the bell crank converting linear motion of the actuator into rotational motion of the ram air door, the bell crank and the one or more linkages converting the rotational motion of the ram air door into sliding motion of the gills.

18. An aircraft comprising:
   a fuselage; and
   a propulsion system coupled to the fuselage, the propulsion system including an engine and an air intake system for the engine, the air intake system switchable between a performance mode and a filtered mode, the air intake system comprising:
   a duct forming a plurality of filtered air inlet slits including a first filtered air inlet slit and a second filtered air inlet slit;
   a plurality of interconnected gills including a first gill and a second gill adjacent to the filtered air inlet slits, the gills movable between a plurality of gill positions including a closed position covering the filtered air inlet slits and an open position exposing the filtered air inlet slits; and
   an actuator configured to slide the gills aft with respect to the engine into the closed position in the performance mode and forward with respect to the engine into the open position in the filtered mode;
   wherein, the first filtered air inlet slit is forward of the second filtered air inlet slit and the first gill is forward of the second gill.

19. The aircraft as recited in claim 18 wherein the aircraft comprises a tiltrotor aircraft including a wing coupled to the fuselage, the propulsion system comprising left and right propulsion systems coupled to outboard ends of the wing, each propulsion system including a respective air intake system.

20. The aircraft as recited in claim 18 wherein the air intake system further comprises a filter covering the gills and the filtered air inlet slits.

* * * * *